May 8, 1928.
C. W. FREDERICK
OBJECTIVE
Filed Feb. 16, 1924
1,668,956
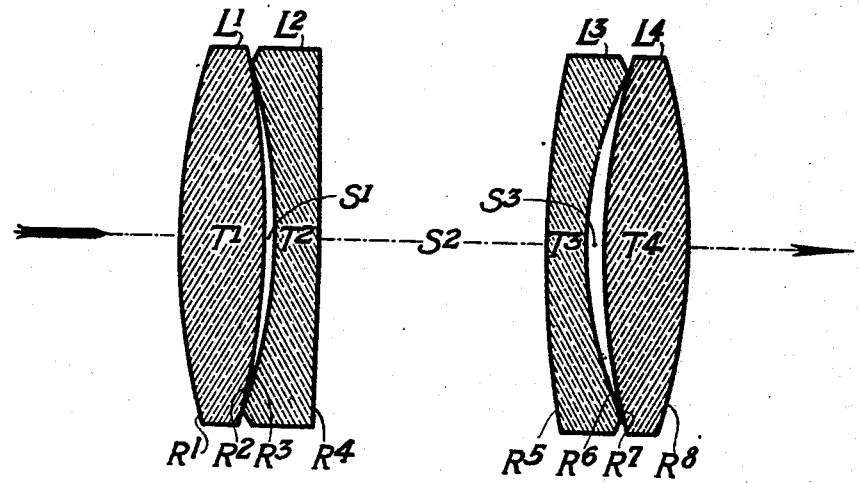
Table for objective with aperture=F/2.8; focal length=100
| lens | focal length | glass | radii | thickness and separation |
|---|---|---|---|---|
| L¹ | +69.64 | D=1.52300 | R₁=65.0 | |
| | | G=1.53430 | | T₁=7.8 |
| | | V=59.0 | R₂=79.6 | S₁=.56 |
| | | D=1.61680 | R₃=63.3 | |
| L² | −110.64 | G=1.63920 | | T₂=3.9 |
| | | V=36.4 | R₄=881.8 | S₂=23.5 |
| | | D=1.61680 | R₅=207.5 | |
| L³ | −110.75 | G=1.63920 | | T₃=3.9 |
| | | V=36.4 | R₆=51.0 | S₃=1.24 |
| | | D=1.52300 | R₇=79.6 | |
| L⁴ | +69.64 | G=1.53430 | | T₄=7.8 |
| | | V=59.0 | R₈=65.0 | |
Charles W. Frederick,
INVENTOR,
BY P. L. Stinchfield
N. M. Perrins
ATTORNEYS.

Patented May 8, 1928.

1,668,956

UNITED STATES PATENT OFFICE.

CHARLES W. FREDERICK, OF ROCHESTER, NEW YORK, ASSIGNOR TO EASTMAN KODAK COMPANY, OF ROCHESTER, NEW YORK, A CORPORATION OF NEW YORK.

OBJECTIVE.

Application filed February 16, 1924. Serial No. 693,300.

My invention relates to an objective and more particularly to one for projection purposes. The requirements for such an objective are that it shall be well corrected over a narrow field and shall work at a large aperture. The object of my invention is to furnish an objective fulfilling these requirements and having the further advantage that it shall be inexpenisve to manufacture, and easily assembled. Some of the methods of attainment of the last object are the use of inexpensive glasses, making the curves as flat as possible, making the elements relatively thick, so that they are not as easily chipped at the edges, and so designing the elements that the spaces between certain of them will permit the lenses to contact at their edges, thus avoiding the use of thin spacing rings.

It is sometimes desirable for certain practical considerations that the gauss points should lie near the center of the objective. But since correction for coma requires that the two halves be unsymmetrical, it has been usual to make the two halves of such different focal length that the gauss points were removed from near the center.

I have met the requirements outlined above in an objective comprising four airspaced elements, of which the two outer are positive and the two inner are negative, and in which the negative lenses are of meniscus form with their concave sides facing the corresponding positive lenses, and of greater curvature than the facing surface, so that the space is of positive meniscus form. The elements are so designed that the axial width of these spaces permits the lenses to contact at their edges.

By making the meniscus lenses of different curvatures, and therefore unsymmetrical, I obtain sufficient correction for coma, while I maintain the gauss points substantially at the center by keeping the two halves of substantially the same focal length. I accomplish this by using similar positives, an economical feature, and making the negatives, though of different form, with substantially the same focal length.

The glasses are inexpensive, spectacle crown being used for the positives, and dense flint for the negatives.

In the accompanying table are set forth the data of a preferred example.

The objective here specified covers an angle of 7° from the axis and is corrected for distortion, spherical and chromatic aberration, which are of particular importance, and also for astigmatism, coma and flatness of field.

In the table and on the accompanying drawing, which shows a section of the objective, the successive lenses from front to back are designated $L^1$ to $L^4$ respectively; the radii of successive surfaces, $R^1$ to $R^8$; the thicknesses, $T^1$ to $T^4$; and the spaces $S^1$ to $S^3$. The indices of refraction of the glass for the D and G' line are also given, as well as the value of the dispersive ratio $(\nu)$.

Table for objective with aperture = F/2.8; focal length = 100.

| Lens. | Focal length. | Glass. | Radii. | Thickness and separation. |
|---|---|---|---|---|
| $L^1$ | +69.64 | D=1.52300<br>G=1.53430<br>$\nu$=59.0 | $R_1$=65.0<br>$R_2$=79.6 | $T_1$=7.8<br>$S_1$= .56 |
| $L^2$ | −110.84 | D=1.61680<br>G=1.63920<br>$\nu$=36.4 | $R_3$=63.3<br>$R_4$=881.8 | $T_2$=3.9<br>$S_2$=23.5 |
| $L^3$ | −110.75 | D=1.61680<br>G=1.63920<br>$\nu$=36.4 | $R_5$=207.5<br>$R_6$=51.0 | $T_3$=3.9<br>$S_3$=1.24 |
| $L^4$ | +69.64 | D=1.52300<br>G=1.53430<br>$\nu$=59.0 | $R_7$=79.6<br>$R_8$=65.0 | $T_4$=7.8 |

The focal length of the front half is 173.43 and that of the rear half is 173.53. The gauss points are located in substantially the same position as in a symmetrical doublet, that is, one on each side of and close to the geometrical center of the objective. They are spaced therefrom by about 0.4.

In this preferred form, the focal lengths of negative lenses and of the two halves are identical within ordinary manufacturing tolerances, and it is desirable that they shall not vary more than is permissible within the limits of such tolerances. As the variation from identity increases the errors due to coma also increase, the other constants of the objective being the same. Experience has shown that, other things being equal, this variation should not, for ordinary purposes, be in excess of an amount of the order of two or three per cent.

It is to be understood that the above described objective is an example and that I contemplate as within the scope of my invention all such modifications and equivalents as fall within the terms of the appended claims.

Having thus described my invention, what I claim as new and desire to secure by Letters Patent is:

1. An objective of the type comprising spaced halves, each of which has an outer positive lens and an inner negative lens spaced therefrom, and characterized by the negative lenses having materially different curvatures, but differing in focal length by less than one per cent.

2. An objective of the type comprising spaced halves, each of which has an outer biconvex positive lens and an inner negative lens, and characterized by the negative lenses being both of meniscus form and spaced from the corresponding positive lenses by spaces less than .015 of the focal length of the objective.

3. An objective of the type comprising spaced halves, each of which has an outer positive lens and an inner negative lens spaced therefrom, and characterized by the negative lenses having different meniscus forms with their convex surfaces facing the center of the objective, and by the two halves of the objective having the same focal length within manufacturing tolerances.

4. An objective comprising spaced halves, each of which has an outer, biconvex, positive lens and an inner negative lens spaced therefrom, and characterized by the negative lenses being of meniscus form with different curvatures, but the same focal length within manufacturing tolerances.

5. An objective of the type comprising two outer, positive elements of the same dimensions and glass and two, dissimilar, inner, negative elements, the negative elements having focal lengths differing by not over three per cent.

6. An objective comprising two outer, positive elements of crown glass and two spaced, dissimilar, inner, negative elements spaced from the positive elements and of flint glass having higher refraction than the positive elements, the negative elements having the same focal length within manufacturing tolerances.

7. An objective of the type comprising spaced halves, each of which has an outer positive lens and an inner negative lens spaced therefrom, and characterized by the negative lenses being of meniscus form and each of the eight surfaces having a radius of curvature greater than one-half of the focal length of the objective.

8. An objective of the type comprising spaced halves, each of which has an outer positive lens and an inner negative lens of meniscus form, with a space between them in the shape of a positive meniscus, and characterized by the axial distance between corresponding positive and negative lenses, being such that the lenses contact at their edges.

9. An objective comprising spaced halves, each of which has an outer biconvex, positive lens and an inner negative lens spaced therefrom, the axial distance from each positive lens to the corresponding negative lens being less than one-tenth of the axial distance between the two negative lenses.

10. An objective comprising two outer, positive, lenses of crown glass and two inner, negative, meniscus, lenses, of flint glass, each of the meniscus lenses having its concave surface facing the corresponding biconvex lens and separated therefrom by a distance less than .15 of the focal length of the objective, the two meniscus lenses differing in curvatures but having focal lengths differing by not over three per cent.

11. An objective comprising two similar, outer, biconvex lenses of crown glass, and two inner, negative, meniscus lenses of flint glass of higher refractive index than the biconvex lenses, each of the meniscus lenses having its concave surface facing the corresponding biconvex lens and separated therefrom by a distance less than .15 of the focal length of the objective, the two meniscus lenses differing in curvatures but having focal lengths differing by not over three per cent.

Signed at Rochester, New York, this 12th day of February, 1924.

CHARLES W. FREDERICK.